United States Patent
Borst et al.

(10) Patent No.: US 9,260,346 B2
(45) Date of Patent: Feb. 16, 2016

(54) GRAFT POLYOL AND METHOD OF FORMING THE SAME

(75) Inventors: Joseph P. Borst, Plymouth, MI (US); Irina Ternyayeva, Commerce Township, MI (US); Steven E. Wujcik, Ann Arbor, MI (US); David K. Bower, Canton, MI (US); Andreas Kunst, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/343,902

(22) PCT Filed: Sep. 11, 2012

(86) PCT No.: PCT/US2012/054653
§ 371 (c)(1),
(2), (4) Date: Mar. 10, 2014

(87) PCT Pub. No.: WO2013/039907
PCT Pub. Date: Mar. 21, 2013

(65) Prior Publication Data
US 2014/0243474 A1     Aug. 28, 2014

Related U.S. Application Data

(60) Provisional application No. 61/533,440, filed on Sep. 12, 2011.

(51) Int. Cl.
| C04B 26/16 | (2006.01) |
| C08F 283/00 | (2006.01) |
| C08G 18/63 | (2006.01) |
| C08G 18/66 | (2006.01) |
| C08G 18/32 | (2006.01) |
| C08G 18/40 | (2006.01) |
| C08G 101/00 | (2006.01) |
| C04B 111/60 | (2006.01) |

(52) U.S. Cl.
CPC .............. *C04B 26/16* (2013.01); *C08F 283/00* (2013.01); *C08G 18/3275* (2013.01); *C08G 18/4072* (2013.01); *C08G 18/631* (2013.01); *C08G 18/6688* (2013.01); *C04B 2111/60* (2013.01); *C08G 2101/005* (2013.01); *C08G 2101/0008* (2013.01); *C08G 2101/0083* (2013.01)

(58) Field of Classification Search
USPC .......................... 526/85, 202; 525/64; 524/590
See application file for complete search history.

(56) References Cited

U.S. PATENT DOCUMENTS

| 3,165,483 | A | 1/1965 | Gemeinhardt et al. |
| 3,622,435 | A | 11/1971 | Cacella |
| 3,960,824 | A | 6/1976 | Hicks |
| 4,172,825 | A | 10/1979 | Shook et al. |
| 4,264,743 | A | 4/1981 | Maruyama et al. |
| 4,357,430 | A | 11/1982 | VanCleve |
| 4,640,801 | A | 2/1987 | Simone et al. |
| 4,652,589 | A | 3/1987 | Simroth et al. |
| 5,196,476 | A | 3/1993 | Simroth |
| 5,354,800 | A | 10/1994 | Suzuki et al. |
| 5,521,262 | A | 5/1996 | Patel et al. |
| 5,854,358 | A | 12/1998 | Heinemann et al. |
| 5,986,011 | A | 11/1999 | Ellis |
| 7,179,882 | B2 | 2/2007 | Adkins et al. |
| 8,106,121 | B2 | 1/2012 | Zaschke et al. |
| 2005/0222361 | A1 | 10/2005 | Zaschke et al. |
| 2006/0025492 | A1 | 2/2006 | Chauk |
| 2007/0106049 | A1 | 5/2007 | Dreisorner et al. |
| 2007/0254973 | A1 | 11/2007 | Emge et al. |
| 2009/0197984 | A1 | 8/2009 | Bartelink et al. |
| 2010/0004785 | A1 | 1/2010 | Mochizuki et al. |
| 2010/0160469 | A1 * | 6/2010 | Adkins et al. ................. 521/137 |

FOREIGN PATENT DOCUMENTS

| CN | 101007861 A | 8/2007 |
| EP | 0 755 953 A2 | 1/1997 |
| EP | 2 202 256 A1 | 6/2010 |
| JP | 2010-116429 A | 5/2010 |
| WO | WO 00/56805 A1 | 9/2000 |
| WO | WO 01/90210 A1 | 11/2001 |
| WO | WO 2006/065345 A1 | 6/2006 |
| WO | WO 2010/055631 A1 | 5/2010 |
| WO | WO 2011/084274 A1 | 7/2011 |
| WO | WO 2011/084793 A1 | 7/2011 |
| WO | WO 2011/084802 A1 | 7/2011 |
| WO | WO 2011/084807 A1 | 7/2011 |

OTHER PUBLICATIONS

International Search Report for Application No. PCT/US2012/054653 dated Nov. 19, 2012, 3 pages.
U.S. Appl. No. 61/220,118, filed Jun. 24, 2009, 44 pages.
U.S. Appl. No. 61/228,637, filed Dec. 21, 2009, 62 pages.

(Continued)

*Primary Examiner* — Tae H Yoon
(74) *Attorney, Agent, or Firm* — Howard & Howard Attorneys PLLC

(57) ABSTRACT

A graft polyol includes a natural oil including at least 50% by weight of a natural oil polyol. Particles are dispersed in the natural oil and comprise the reaction product of a macromer polyol, a polymerizable monomer, a chain transfer agent, and a free radical initiator. The macromer polyol and the polymerizable monomer react in the presence of the natural oil. The graft polyol is formed by providing the natural oil and providing the macromer polyol, the chain transfer agent, the free radical initiator, and the polymerizable monomer. The natural oil, the polymerizable monomer, the macromer polyol, the chain transfer agent, and the free radical initiator are combined, and the polymerizable monomer, the macromer polyol, the chain transfer agent, and the free radical initiator react to form particles dispersed in the natural oil.

18 Claims, No Drawings

(56) References Cited

OTHER PUBLICATIONS

English language abstract and machine-assisted English translation for CN 101007861 extracted from espacenet.com database on Jun. 18, 2014, 30 pages.

English language abstract for EP 0 755 953 extracted from espacenet.com database on Jun. 18, 2014, 9 pages.

English language abstract and machine-assisted English translation for JP 2010-116429 extracted from the PAJ database on Jun. 18, 2014, 46 pages.

English language abstract for WO 2010/055631 extracted from espacenet.com database on Jun. 18, 2014, 39 pages.

* cited by examiner

GRAFT POLYOL AND METHOD OF FORMING THE SAME

CROSS REFERENCE TO RELATED APPLICATIONS

This application is the National Stage of International Patent Application No. PCT/US2012/054653, filed on Sep. 11, 2012, which claims the benefit of U.S. Provisional Patent Application Ser. No. 61/533,440 filed on Sep. 12, 2011, the contents of which are incorporated herein by reference in their entirety.

FIELD OF THE INVENTION

The present invention generally relates to a graft polyol, a method of forming the graft polyol, and a polyurethane article formed using the graft polyol. More specifically, the graft polyol includes a natural oil including a natural oil polyol.

DESCRIPTION OF THE RELATED ART

Polyols are particularly useful in polyurethane foam applications. However, conventional polyols are typically derived from petroleum. As a non-renewable feedstock, petroleum has both environmental and financial drawbacks.

An alternative to petroleum-based polyols are polyols derived from natural oils. However, almost all natural oils require chemical modification before they can be used in polyurethane foam applications. More specifically, most natural oils lack multiple hydroxyl groups and thus cannot readily react with isocyanates to form a desired product. Therefore, chemical modification of the natural oil is typically necessary. However, chemical modification is time consuming, increases production costs, increases use of non-renewable energy sources, and excessively increases the viscosity of the natural oil thereby reducing usability.

Still another approach has been the use of castor oil, a natural oil which includes a natural oil polyol (NOP) having multiple hydroxyl groups. It is known that castor oil, extracted from seeds of *Ricinus communis*, naturally contains these hydroxyl groups without chemical modification. However, polyurethane foams formed using castor oil generally have undesirable odors and have relatively less desirable physical properties compared to those polyurethane foams formed using petroleum-based polyols.

Efforts to improve the physical properties of polyurethane foams formed using castor oil have included chemically modifying the castor oil. However, polyols comprising chemically modified castor oil are not as stable as petroleum-based polyols, and chemical modification of the castor oil leads to viscosity increases of the resulting polyol. Viscosity increases are particularly detrimental when the resulting polyol comprises a graft polyol. Graft polyols generally describe a class of products which are stable dispersions of particles suspended in a carrier, i.e., a polyol. Increased viscosity of modified castor oil increases the viscosity of graft polyols, formed therefrom, which reduces usability of the graft polyols in many commercial processes. Additionally, the increased viscosity limits the maximum achievable solids content of the graft polyols because increasing solids content further increases viscosity of the graft polyol. Accordingly, there remains an opportunity to form improved graft polyols.

SUMMARY OF THE INVENTION AND ADVANTAGES

The present invention provides a graft polyol, a method of forming the graft polyol, and a polyurethane article formed using the graft polyol. The graft polyol includes a natural oil including a natural oil polyol wherein at least 50% by weight of the natural oil polyol is represented by formula (I):

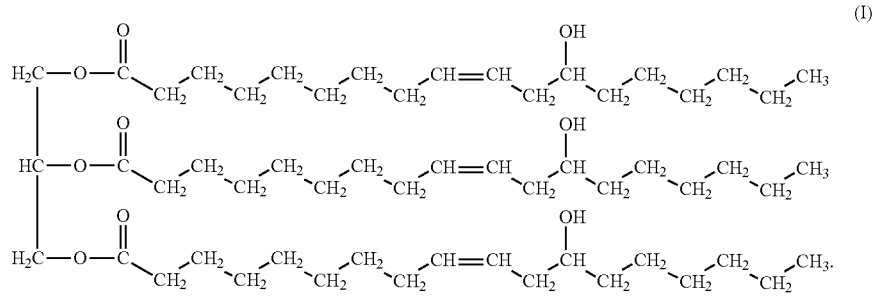 [SMILES: CCCCCCC(O)C/C=C\CCCCCCCC(=O)OCC(COC(=O)CCCCCCC/C=C\CC(O)CCCCCC)OC(=O)CCCCCCC/C=C\CC(O)CCCCCC]

The graft polyol also includes particles that are dispersed in the natural oil. The particles include the reaction product of a macromer polyol, a polymerizable monomer, a chain transfer agent, and a free radical initiator. The macromer polyol, the polymerizable monomer, the chain transfer agent, and the free radical initiator react in the presence of the natural oil.

The method of forming the graft polyol includes the steps of providing the natural oil, the macromer polyol, the polymerizable monomer, the chain transfer agent, and the free radical initiator. The method further includes the step of combining the natural oil, the macromer polyol, the polymerizable monomer, the chain transfer agent, and the free radical initiator. Additionally, the method includes the step of reacting the macromer polyol, the polymerizable monomer, the chain transfer agent, and the free radical initiator to form the graft polyol. The present invention also provides a polyurethane article including the reaction product of a di- and/or poly-isocyanate and the graft polyol.

The graft polyol of the present invention has environmental, economic, and commercial advantages. More specifically, the natural oil polyol represented by formula (I) is derived from renewable feedstocks, is not chemically modified, and increases bio-content of any product produced therefrom.

Additionally, due to the inclusion of the unmodified natural oil polyol, and the method of forming the graft polyol, the graft polyol formed therefrom has increased solids content, decreased viscosity, and improved filterability, allowing for improved handling and decreased reliance on petroleum-based products. Further, the polyurethane article formed using the graft polyol has increased bio-content and improved physical properties comparable to or better than polyurethane foams formed using petroleum-based polyols.

DETAILED DESCRIPTION OF THE INVENTION

The present invention provides a graft polyol, a method of forming the graft polyol, and a polyurethane article formed from the graft polyol. The graft polyol has excellent usability, ease of handling, and is suitable for applications including, but not limited to, formation of polyurethane articles. Polyurethane articles formed using the graft polyol are suitable for both automotive and non-automotive applications such as in farming or sporting applications in seats, panels, doors, and the like. The polyurethane articles are not limited to any particular use.

The graft polyol includes a natural oil and particles dispersed in the natural oil. The particles include the reaction product of a macromer polyol, a polymerizable monomer, a chain transfer agent, and a free radical initiator. More specifically, the macromer polyol, the polymerizable monomer, the chain transfer agent, and the free radical initiator react in the presence of the natural oil.

Natural Oil:

The natural oil includes by weight at least 50% of a natural oil polyol (NOP) represented by formula (I):

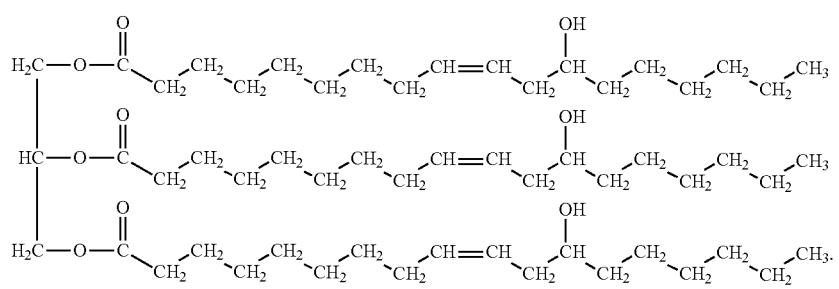

In one embodiment, the balance (or remainder) of the natural oil includes naturally occurring triglycerides, triglycerides having monol or diol functionality, fatty acids, or combinations thereof.

The natural oil, including the NOP, is not petroleum-based but is naturally occurring and typically extracted from plant materials. In one embodiment, the natural oil, including the NOP, is produced by extraction from plant matter. A particularly suitable natural oil is castor oil which is extracted from seeds of the plant *Ricinus communis*. Castor oil is a triglyceride of various fatty acids including, but not limited to, ricinoleic acid, oleic acid, linoleic acid, linolenic acid, stearic acid, palmitic acid, and dihydroxystearic acid. Triglycerides formed from ricinoleic acid generally have at least one unreacted hydroxyl group. Typically, from about 85% to about 95% of fatty acids present in castor oil are ricinoleic acid, based on the total number of fatty acids present. However, as described above, castor oil is a triglyceride of various fatty acids and typically only from about 50% to about 60% of the total ricinoleic acid present in castor oil exists in a form having triol functionality, as illustrated by formula (I). Typically, the remaining ricinoleic acid is present in triglycerides having monol or diol functionality in an amount of from about 40% to about 50% of the total ricinoleic acid present in castor oil. Notably, neither the natural oil nor the NOP is chemically modified and therefore the chemical structure of the NOP is the same, or unchanged, from the chemical structure of the NOP as found in nature. Accordingly, the NOP includes only naturally occurring hydroxyl groups unlike conventional chemically modified NOPs. Most natural oils lack multiple hydroxyl groups. More specifically, most natural oils lack triol functionality. Therefore, to obtain a product from these natural oils which has triol functionality or greater, the natural oils must undergo chemical modification. Additionally, those natural oils which may include natural oil polyols are typically chemically modified to further increase hydroxyl functionality or to modify other chemical properties of the natural oils. Accordingly, all chemically modified natural oils typically include one or more chemical bonds and/or functional groups added through chemical modification. Therefore, chemically modified natural oils typically have different chemical structures than those of any precursor natural oils from which they are derived. It is contemplated that the invention NOP could be purified to increase the amount of ricinoleic acid present in castor oil in a form having triol functionality, as illustrated by formula (I), so long as the NOP is not chemically modified/altered from the chemical structure of the NOP as found in nature.

In one embodiment, in addition to including the NOP, the natural oil further includes one or more supplemental oils. The one or more supplemental oils may include natural oils other than castor oil, chemically modified natural oil polyols, and/or conventional polyols, e.g. polyols derived from petroleum. In one embodiment, the natural oil comprises castor oil in an amount of from 10% to 99%, 50% to 99%, 75% to 99%, 90% to 99%, at least 90%, or at least 99%, by weight, each based on the total weight of the natural oil.

The natural oil typically serves as a "solvent" and/or "carrier" for the polymerizable monomer, dissolving the polymerizable monomer such that the polymerizable monomer can react and polymerize. The natural oil also typically serves as a "solvent" and/or "carrier" for the macromer polyol, the free radical initiator, and the chain transfer agent. Typically, the natural oil is present in the graft polyol an amount of from 30% to 90%, 35% to 75%, 35% to 70%, 40% to 70%, 50% to 60%, or 60% to 70%, by weight, each based on the total weight of the graft polyol.

Particles:

As described above, the graft polyol includes particles dispersed in the natural oil, which are the reaction product of the polymerizable monomer, the macromer polyol, the chain transfer agent, and the free radical initiator reacted in the presence of the natural oil. In certain embodiments, the reaction product comprises the polymerizable monomer, the macromer polyol, and the free radical initiator, in the presence of the chain transfer agent. In other embodiments, the chain transfer agent becomes part of the reaction product. Typically, from 80% to 97% by weight based on the total weight of the particles is attributable to the polymerizable monomer and alternatively from 85% to 95% by weight based on the total weight of the particles. Additionally, typically from 3% to 20% by weight based on the total weight of the particles is attributable to the macromer polyol and alternatively from 5% to 15% by weight based on the total weight of the particles.

The particles are typically solid and contribute to, or make up all of, a solids content of the graft polyol. Said another way, the particles may be equivalent to the solids content, or the solids content could include the particles and one or more additional solid components, such as an additive component. Typically, the graft polyol has a solids content of at least 25%, alternatively at least 30%, alternatively of from 25% to 75%, 30% to 65%, 30% to 60%, or 40% to 50%, by weight, each based on the total weight of the graft polyol. In various embodiments, the particles have a volume weighted mean particle diameter of at least 0.4 µm or about 0.4 µm, and alternatively at least 2 to 3 µm or about 2 to 3 µm. In related embodiments, at least 10% of the particles have a volume weighted mean particle diameter of at least 0.9 µm and alternatively at least 10.0 µm. In certain embodiments, the particles have a volume weighted mean particle diameter of from about 1 to about 5, alternatively about 2 to about 5, or about 3, µm. In various embodiments, no greater than 20%, alternatively 15%, or 10% of the particles have a volume weighted mean particle diameter of 15, alternatively 12.5, or 10.0, µm. In other related embodiments, at least about 10% of the particles, by volume, have particle sizes of about 0.15 µm or smaller. It is to be appreciated that the particles can be of various sizes or ranges between, above, or below the upper and lower particle sizes expressly described herein.

Polymerizable Monomer:

The polymerizable monomer may be any known in the art and, when polymerized with the macromer polyol, contributes to the solids content of the graft polyol. In one embodiment, the polymerizable monomer is selected from the group of styrenes, esters of acrylic and methacrylic acids, ethylenically unsaturated nitriles and amides, and combinations thereof. In another embodiment, the polymerizable monomer includes styrenes, ethylenically unsaturated nitriles and amides, and combinations thereof. In yet another embodiment, the polymerizable monomer includes styrene and acrylonitrile.

Examples of the styrenes include, but are not limited to, styrene, para-methyl styrene, and combinations thereof. Examples of the ethylenically unsaturated nitriles and amides include, but are not limited to, acrylonitrile, methacrylonitrile, acrylamide, and combinations thereof.

In certain embodiments, 25% to 50% of the total weight of the polymerizable monomer used to form the graft polyol is acrylonitrile, alternatively from 30% to 40%, alternatively from 30% to 35%, and alternatively about 33%. In other embodiments, 50% to 75% of the total weight of the polymerizable monomer used to form the graft polyol is styrene, alternatively from 60% to 70%, alternatively from 65% to 70%, and alternatively about 66%. In certain embodiments, the particles comprise 1 to 3 acrylonitrile (AN) to styrene (Sty) (i.e., 1AN:3Sty), alternatively 3AN:1Sty, 2AN:1Sty, 1AN:2Sty, or 1AN:1Sty. In these embodiments, the particles may be referred to as styrene-acrylonitrile (SAN) or SAN copolymer particles. It is to be appreciated that the SAN copolymer particles can comprise various ratios of AN to Sty, such as different ratios falling between, above, or below the monomer ratios expressly described herein.

Macromer Polyol:

The macromer polyol, when polymerized with the polymerizable monomer, also contributes to the solids content of the graft polyol. The macromer polyol also provides steric stabilization of the particles to reduce flocculation. The macromer polyol differs from the natural oil in that the macromer polyol typically has a higher number average molecular weight than the natural oil. Typically, the macromer polyol has a number average molecular weight of from 3,000 to 30,000, 5,000 to 20,000, or 5,000 to 15,000, g/mol.

In one embodiment, the macromer polyol has alkene functionality and copolymerizes with the polymerizable monomer during free radical polymerization. The macromer polyol may be formed by reacting a sorbitol initiated polyol and an ethylenically unsaturated isocyanate in the presence of a catalyst. The sorbitol initiated polyol may be any known in the art and is not particularly limited. Typically, the sorbitol initiated polyol has an OH number of from 14 to 22, alternatively 17 to 19. Suitable examples of the ethylenically unsaturated isocyanate include, but are not limited to, α,α-dimethyl-meta-isopropenylbenzyl isocyanate and 2-Isocyanatoethyl methacrylate, and combinations thereof. The catalyst is typically an organometallic compound based on mercury, lead, tin, bismuth, or zinc. One suitable example of the catalyst is dibutyltin dilaurate. In another embodiment, the macromer polyol is fumarate based. Particularly suitable macromer polyols are commercially available from BASF Corporation of Florham Park, N.J., under the trade name of Pluracol®.

Referring now to the free radical initiator, the free radical initiator may be any known in the art. In one embodiment, the free radical initiator is selected from the group of peroxides, peroxy esters, trioxides, tetroxides, azo compounds, polyphenylhydrocarbons, hydrazines, alkoxyamines, nitrates, nitrites, disulfides, polysulfides, organometallics, and combinations thereof.

In another embodiment, the free radical initiator is a peroxide or may include a combination of peroxides. The peroxide may include the "group"—O—O—. The peroxide may alternatively include the general formula:

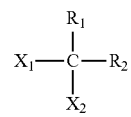

wherein each of $R_1$ and $R_2$ comprises one of an alkyl group, an oxygen-alkyl group and an oxygen-oxygen-alkyl group, $X_1$ comprises one of an ester group, an oxygen, and an alkyl group, and $X_2$ comprises a methyl group so long as $X_1$ is an ester group. Typically, the peroxide includes monoperoxycarbonates, peroxyketals, and combinations thereof.

In yet another embodiment, the free radical initiator has diimide functionality, i.e., the free radical initiator is an "azo" free radical initiator. In this embodiment, the free radical initiator typically includes 2,2'-azobis(2-methylbutanenitrile) that is commercially available from Akzo Nobel under the trade name of AMBN-gr. The free radical initiator is typically provided in an amount of from 0.01 to 5 and alternatively from 0.1 to 1, parts by weight, each per 100 parts by weight of the polymerizable monomer.

Referring now to the chain transfer agent, it is to be appreciated that the chain transfer agent functions as a reaction moderator. In one embodiment, the chain transfer agent is a thiol. In this embodiment, the chain transfer agent is selected from the group of alkanethiols, mercaptocarboxylic acids, hydroxylmercaptans, aminomercaptans, carboxylsulfides, sulfide acid anhydrides, salts thereof, and combinations thereof. One example of suitable alkanethiols is 1-dodecanethiol. The chain transfer agent is typically provided in an amount of from 0.1 to 5 and alternatively from 0.1 to 2, parts by weight, each per 100 parts by weight of the polymerizable monomer.

Without being bound by any particular theory, it is believed that the natural oil and the particles comprising the reaction product of the polymerizable monomer, the macromer polyol, the chain transfer agent, and the free radical initiator reacted in the presence of the natural oil of this invention allow the graft polyol to support a high concentration of solids and to have excellent viscosity. It is also believed that the particles have excellent steric stabilization thereby minimizing flocculation and traditional increases in viscosity associated with high concentrations of solids in graft polyols. Typically, even at a solids content of at least 25%, alternatively at least 30%, or from 30% to 65%, by weight, each based on the total weight of the graft polyol, the graft polyol has a viscosity of less than 30,000, alternatively less than 20,000, less than 10,000, less than 6,000, or less than 4,000, centipoise (cP), each measured using a Brookfield Digital Viscometer including a No. 21 spindle, at 25 rpm, and at 25° C.

Method of Forming the Graft Polyol:

As first introduced above, the present invention also provides the method of forming the graft polyol. The method includes the step of providing the natural oil, the polymerizable monomer, the macromer polyol, the chain transfer agent, and the free radical initiator. The step of providing may be further defined as independently providing each of, or providing in one or more combinations, the natural oil, the polymerizable monomer, the macromer polyol, the chain transfer agent, and the free radical initiator. The method also includes the step of combining the natural oil, the polymerizable monomer, the macromer polyol, the chain transfer agent, and the free radical initiator and the step of reacting the polymerizable monomer, the macromer polyol, the chain transfer agent, and the free radical initiator in the presence of the natural oil to form the graft polyol. The step of reacting may occur contemporaneously with the step of combining, or may occur sometime thereafter.

The natural oil, the polymerizable monomer, the macromer polyol, the chain transfer agent, and the free radical initiator may be combined in any order, at any temperature, and at any pressure. In one embodiment, the step of combining is further defined as combining the natural oil and the free radical initiator prior to combining the polymerizable monomer, the macromer polyol, the chain transfer agent, the natural oil, and the free radical initiator. In another embodiment, the step of combining is further defined as combining the polymerizable monomer and the chain transfer agent prior to combining the polymerizable monomer, the chain transfer agent, the natural oil, the macromer polyol, and the free radical initiator.

In yet another embodiment, the natural oil is divided into a first portion and a second portion. In this embodiment, the step of combining is further defined as combining the first portion of the natural oil and the macromer polyol, combining the polymerizable monomer and the chain transfer agent, and combining the second portion of the natural oil and the free radical initiator, each independently. Subsequently, each of these independent portions, the first portion of the natural oil and the macromer polyol, the polymerizable monomer and the chain transfer agent, and the second portion of the natural oil and the free radical initiator are combined. In this embodiment, the natural oil is typically divided into the first and second portions in a ratio of 10:90 to 90:10, alternatively 40:60 to 60:40.

Each of the natural oil, the polymerizable monomer, the macromer polyol, the chain transfer agent, and the free radical initiator are combined in a reaction vessel. The reaction vessel may have any size and may be any known in the art that is suitable for use.

The step of combining the natural oil, the polymerizable monomer, the macromer polyol, the chain transfer agent, and the free radical initiator may be further defined as combining at a temperature of from 80° to 155°, 115° to 145°, 135° to 145°, or 120° to 140°, C. Also, the step of combining may be further defined as combining at pressure of less than 20 pounds per square inch (psi) and alternatively at atmospheric pressure. The natural oil, the polymerizable monomer, the macromer polyol, the chain transfer agent, and the free radical initiator may also be combined over any amount of time.

In one embodiment, the method includes the step of forming a "reactor charge" that includes the macromer polyol and a first amount of the natural oil combined at a temperature of from 120° to 145° C., at atmospheric pressure, in a reactor. In one embodiment, the macromer polyol is present in the "reactor charge" in an amount of from 1% to 30%, 5% to 25% by weight, or 15% to 25%, by weight, each based on the total weight of the "reactor charge".

Without intending to be limited by any particular theory, it is believed that increased amounts of the macromer polyol in the "reactor charge" improves dispersion and filterability of the graft polyol and reduces seeding. In this embodiment, the method also includes the step of forming a "monomer charge" that includes the polymerizable monomer and the chain transfer agent combined in an auxiliary vessel and added at atmospheric pressure, and over a time period of about 180 minutes to a reactor with the "reactor charge" at a temperature of from 120° to 145° C. Additionally, in this embodiment, the method includes the step of forming an "initiator charge" that includes a second amount of the natural oil combined with the free radical initiator in a second auxiliary vessel and added at atmospheric pressure and over a time period of about 198 minutes to a reactor with the "reactor charge" at a temperature of from 120° to 145° C. In this embodiment, the "reactor charge," the "monomer charge," and the "initiator charge" may be formed in any order and after formation, the "monomer charge" and the "initiator charge" are typically added to the reactor with the "reactor charge." However, the "reactor charge," the "monomer charge," and the "initiator charge" may be added together and combined in any order. In another embodiment, an additional amount of the macromer polyol is introduced into the reactor, in a "macromer stream," at a temperature of from 120° to 145° C., at atmospheric pressure, and over a time period of from about 5 to about 100 minutes. In one embodiment, the "monomer charge" and the "initiator charge" are added to a reactor with the "reactor charge" at a temperature of from 135° to 145° C. Without intending to be limited by any particular theory, it is believed that increased temperatures improve filterability of the graft polyol. It is contemplated that in various embodiments, one or more of the time periods described above may vary by ±5%, 10%, 15%, 20%, 25%, 30%, or more.

Referring back to the method, after the natural oil, the polymerizable monomer, the macromer polyol, the chain transfer agent, and the free radical initiator are combined, the method also includes the step of reacting the polymerizable monomer, the macromer polyol, the chain transfer agent, and the free radical initiator to polymerize the polymerizable monomer and the macromer polyol in the presence of the natural oil and form the particles dispersed in the natural oil.

In one embodiment, the method also includes the step of separating residual amounts of components including, but not limited to, the polymerizable monomer from the graft polyol. This step of separating is known in the art as "stripping". The step of separating may be accomplished by any suitable method known in the art. In one embodiment, the step of separating may be further defined as applying a vacuum to separate the residual amounts of components from the graft polyol. However, it is to be understood that separating is not required.

Polyurethane Article:

The present invention also provides the polyurethane article including the reaction product of a di- and/or poly-isocyanate and the graft polyol of the present invention, as first introduced above. It is also contemplated that the polyurethane article may include the reaction product of the isocyanate component, the graft polyol of the present invention, and one or more additional polyols. It is contemplated that any polyol known in the art may be used as the one or more additional polyols.

The isocyanate component may include any isocyanate known in the art including, but not limited to isocyanates, polyisocyanates, biurets of isocyanates and polyisocyanates, isocyanurates of isocyanates and polyisocyanates, and combinations thereof. The isocyanate component may include an isocyanate selected from the group of aromatic isocyanates, aliphatic isocyanates, and combinations thereof. In one embodiment, the isocyanate component includes an aliphatic isocyanate. If the isocyanate component includes an aliphatic isocyanate, the isocyanate component may also include a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof. The isocyanate component may also include, but is not limited to, modified diisocyanates employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof.

Alternatively, the isocyanate component may include an aromatic isocyanate. If the isocyanate component includes an aromatic isocyanate, the aromatic isocyanate may correspond to the formula $R'(NCO)_z$ wherein R' is a polyvalent organic radical which is aromatic and z is an integer that corresponds to the valence of R'. Typically, z is at least two. If the isocyanate component includes the aromatic isocyanate, the isocyanate component may include, but is not limited to, the tetramethylxylylene diisocyanate (TMXDI), 1,4-diisocyanato-benzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. Alternatively, the aromatic isocyanate may include a triisocyanate product of m-TMXDI and 1,1,1-trimethylolpropane, a reaction product of toluene diisocyanate and 1,1,1-trimethylolpropane, and combinations thereof.

The isocyanate component may have any % NCO content and any viscosity. The isocyanate component may also react with the graft polyol in any amount, as determined by one skilled in the art. Typically, the isocyanate index is from 90 to 120 and alternatively from 100 to 110.

The graft polyol and/or isocyanate component may also include an additive selected from the group of chain extenders, anti-foaming agents, processing additives, plasticizers, chain terminators, surface-active agents, adhesion promoters, flame retardants, anti-oxidants, water scavengers, fumed silicas, dyes, ultraviolet light stabilizers, fillers, thixotropic agents, silicones, amines, transition metals, catalysts, blowing agents, surfactants, cross-linking agents, inert diluents, chain extenders, flame retardants, water, and combinations thereof. The additive may be included in any amount as desired by those of skill in the art.

The polyurethane article is typically a flexible foam as opposed to a rigid foam as understood in the art. However, it is to be understood that the polyurethane article is not limited to a flexible foam. If a flexible foam, the polyurethane article may be used in a wide variety of industries including, but not limited to, building and automotive supplies, e.g. seat cushions.

Additionally, the polyurethane article typically has a density of from 0.5 to 10, 0.8 to 7, or 1 to 5, pounds per cubic foot (pcf). Typically, the polyurethane article has a tensile strength of less than 20 and alternatively of from 5 to 15, psi. Typically the polyurethane article has a percent elongation of from 30 to 300, 40 to 200, or 50 to 150. Typically, the polyurethane article has a Graves tear (or tear resistance) of from 0.5 to 4, 0.7 to 3, or 1 to 2, pounds per inch or per square inch (ppi). Typically, the polyurethane article has an indentation force deflection (IFD) value at 25% of from 2 to 150 and alternatively 5 to 45, pounds per 50 square inches (lbs/50 in$^2$). Typically, the polyurethane article has an IFD value at 65% of from 4 to 300, 10 to 200, or 20 to 90, lbs/50 in$^2$. Typically, the polyurethane article has a Fraizer Airflow of from 1.0 to 360, 5 to 300, or 10 to 270, cubic feet per minute per square foot (cfm/ft$^2$). Without intending to be bound by any particular theory, it is believed that that the natural oil contributes to softness of polyurethane articles formed using the invention graft polyol.

Pavement Composition:

The present invention also provides a pavement composition including a construction aggregate and a binder. The binder includes an isocyanate and the graft polyol of the present invention.

Examples of suitable construction aggregates, isocyanates, and methods of forming the pavement composition, for purposes of the present invention, are disclosed in International Publication No. WO 2011/084793, International Publication No. WO 2011/084802, International Publication No. WO 2011/084807, U.S. Patent Application No. 61/288,637, and U.S. Patent Application No. 61/220,118, the disclosures of which are incorporated herein by reference in their entirety, to the extent that the disclosures do not conflict with the general scope of the present invention. As just one example, the aggregate disclosed in International Publication No. 2011/084807 can be used in place of the construction aggregate of the present invention.

In one embodiment, the binder includes additional components in addition to the isocyanate and the graft polyol. For example, the binder may also include an additive selected from the group of chain extenders, anti-foaming agents, processing additives, plasticizers, chain terminators, surface-active agents, adhesion promoters, flame retardants, anti-oxidants, water scavengers, fumed silicas, dyes, ultraviolet light stabilizers, fillers, thixotropic agents, silicones, amines, transition metals, catalysts, blowing agents, surfactants, cross-linking agents, inert diluents, chain extenders, flame retardants, water, and combinations thereof. The additive may be included in any amount as desired by those of skill in the art.

Typically, the binder has a density of from 40 to 80, 50 to 70, or 60 to 65, pcf. Typically, the binder has a tensile strength of from 1,500 to 2,500, 1,800 to 2,500, or 1,800 to 2,000, psi. Typically, the binder has a Shore A hardness at instant of from 80 to 95 and alternatively from 85 to 90. Typically, the binder has a Shore A hardness at dwell of from 80 to 95 and alternatively 85 to 90. Typically, the binder has a Graves tear of from 80 to 110 and alternatively 90 to 100, ppi. Typically, the binder has an elongation of from 30 to 45 and alternatively 35 to 40, %.

The following examples, illustrating the graft polyol, the method of forming the graft polyol, the polyurethane article, and the pavement composition of the present invention, are intended to illustrate and not to limit the invention.

EXAMPLES

Formation of Inventive Graft Polyols

A series of graft polyols (Inventive Graft Polyols 1-3 and A-C) is formed according to the method of the present invention.

Specifically, to form the Inventive Graft Polyols 1-3 and A-C, a "Monomer Charge" is formed and includes Acrylonitrile and Styrene, which serve as two polymerizable monomers, and a Chain Transfer Agent, combined in a first auxiliary reservoir, as set forth in Table 1. Additionally, an "Initiator Charge" is also formed and includes a Natural Oil A and a Free Radical Initiator combined and added to a second auxiliary reservoir, also set forth in Table 1. Further, a "Reactor Charge" is formed and includes a Macromer Polyol and an additional amount of the Natural Oil A, added to a reactor, heated to 125° C. or 140° C., and stirred at a rate of from 300 to 500 RPM, as further set forth in Table 1. All amounts are based on weight percent unless otherwise indicated.

Further, a "Macromer Charge" may be optionally added to the reactor during the addition of the addition of "Monomer Charge" and the "Initiator Charge." After formation of the "Reactor Charge," the "Monomer Charge" and the "Initiator Charge" are added over 180 minutes to the "Reactor Charge" in the reactor, heated to 125° C. or 140° C., and stirred at a rate of from 300 to 500 RPM to begin forming the Inventive Graft Polyols. Optionally, as described in Table 1, the "Macromer Charge" may be added 15 minutes after beginning the addition of the "Monomer Charge" and the "Initiator Charge" over the time specified in Table 1. After formation, Inventive Graft Polyols 1-3 are heated to 135° C. and vacuum stripped for 30 minutes to separate a residual amount of the Acrylonitrile and the Styrene from the Inventive Graft Polyols.

Inventive Graft Polyol 1 is formed using the method described above and a temperature of 125° C. Amounts of components used to form Inventive Graft Polyol 1 are set forth in Table 1 below.

Inventive Graft Polyol 2 is formed using the same method described above and a temperature of 135° C. Additionally, Inventive Graft Polyol 2 is formed using a different natural oil and different amounts of components than Inventive Graft Polyol 1 as set forth in Table 1.

Inventive Graft Polyol 3 is formed using the same method described above and a temperature of 135° C. Additionally, Inventive Graft Polyol 3 is formed using a different natural oil and different amounts of components than Inventive Graft Polyols 1 and 2 as set forth in Table 1.

Inventive Graft Polyol A is formed using the same method described above and a temperature of 135° C. Additionally, Inventive Graft Polyol A is formed using a different natural oil and different amounts of components than Inventive Graft Polyols 1 and 3 as set forth in Table 1.

Inventive Graft Polyol B is formed using the same method described above and a temperature of 135° C. Additionally, Inventive Graft Polyol B is formed using a different natural oil and different amounts of components than Inventive Graft Polyols 1 and 3 as set forth in Table 1.

Inventive Graft Polyol C is formed using the same method described above and a temperature of 125° C. Additionally, Inventive Graft Polyol C is formed using a different natural oil and different amounts of components than Inventive Graft Polyols 1 and 3 as set forth in Table 1.

Viscosity is measured using a Brookfield Digital Viscometer with a No. 21 spindle, at 25 rpm, and at 25° C.

TABLE 1

| | | Inventive Graft Polyol 1 | Inventive Graft Polyol 2 | Inventive Graft Polyol 3 | Inventive Graft Polyol A | Inventive Graft Polyol B | Inventive Graft Polyol C |
|---|---|---|---|---|---|---|---|
| Monomer Charge | Acrylonitrile | 10% | 20% | 11.43% | 20.00% | 20.00% | 16.66% |
| | Styrene | 20% | 40% | 22.86% | 40.00% | 40.00% | 33.33% |
| | Chain Transfer Agent | 0.32% | 0.63% | 0.36% | 0.63% | 0.63% | 0.53% |
| Initiator Charge | Natural Oil A | 34.71% | — | — | — | — | — |
| | Natural Oil B | — | 18.68% | — | 21.08% | 20.16% | 23.51% |
| | Natural Oil C | — | — | 30.33% | — | — | — |
| | Free Radical Initiator | 0.20% | 0.20% | 0.15% | 0.20% | 0.20% | 0.20% |
| Reactor Charge | Natural Oil A | 32.52% | — | — | — | — | — |
| | Natural Oil B | — | 17.49% | — | 15.69% | 16.91% | 22.02% |
| | Natural Oil C | — | — | 28.01% | — | — | — |
| | Macromer Polyol A | 2.25% | 3.00% | — | — | — | 3.75% |
| | Macromer Polyol B | — | — | 4.80% | 0.24% | 1.05% | — |
| Macromer Charge | Macromer Polyol A | — | — | — | — | — | — |
| | Macromer Polyol B | — | — | 2.06% | 2.16 | 1.05 | — |
| | Macromer Feed Time (min) | — | — | 35 | 45 | 22 | — |
| Solids Content (Actual) | | 28.20% | 59.16% | 32.97% | 59.28% | 57.37% | 49.63% |
| Viscosity (cP) | | 3,000 | 24,300 | 8,800 | 37,750 | 60,500 | 24,300 |
| Filterability* | | 1 | 4 | 3 | 4 | 2 | 1 |
| Seediness* | | 2 | 4 | 4 | 3 | 3 | 2 |

*On a scale of 1 to 4, where 2 is superior to 1, 3 is superior to 2 and 4 is superior to 3.

The Inventive Graft Polyols of the present invention generally exhibit very good to excellent filterability, solids content, and viscosity. Accordingly, the Inventive Graft Polyols are more suitable for environmentally friendly applications than conventional petroleum-based polyols and graft polyols. More specifically, the Inventive Graft Polyols are suitable for use in formation of polyurethane articles, including but not limited to, seat cushions.

Styrene and Acrylonitrile are commercially available from Sigma Aldrich Corporation of St. Louis, Mo.

Chain Transfer Agent is 1-dodecanethiol and is commercially available from Sigma Aldrich Corporation.

Natural Oil A is commercially available from Eagle Specialty Products of St. Louis, Mo., under the trade name T500 Oil and includes a midgrade castor oil.

Natural Oil B is commercially available from Eagle Specialty Products under the trade name T31 Oil and includes a highly refined castor oil.

Natural Oil C is commercially available from BASF Corporation Florham Park, N.J., under the trade name Pluracol® Balance 160 and includes a castor oil.

Free Radical Initiator is commercially available from Akzo Nobel of Arnhem, Netherlands under the trade name of AMBN-gr and includes 2,2'-azobis(2-methylbutanenitrile).

Macromer Polyol A, a TMI adduct commercially available from BASF Corporation, is derived from a sorbitol-initiated propylene oxide, ethylene oxide adduct that has a hydroxyl number of 18 and a number average molecular weight of about 6,000 g/mol.

Macromer Polyol B, fumarate-based and commercially available from BASF Corporation, is derived from a glycerine-initiated propylene oxide, ethylene oxide adduct with a hydroxyl number of 27 and a number average molecular weight of about 4,600 g/mol.

Formation of Polyurethane Articles:

Inventive Graft Polyols A and B as well as Conventional Graft Polyols A-D are utilized to form polyurethane articles. Specifically, Inventive Graft Polyol A is utilized to form Inventive Articles 1-8 and Inventive Graft Polyol B to form Inventive Articles 9-13. Conventional Graft Polyols A-D are each used in various amounts and combinations to form Comparative Articles 1-13.

To form the Inventive and Comparative Articles the Inventive and Conventional Graft Polyols are combined with a toluene diisocyanate, in some instances a polyol, and additional components, as also set forth in Tables 2 and 3 below, respectively. The Inventive and Conventional Graft Polyols, isocyanate, in some instances the polyol, and the additives are mixed at 1750 RPM and poured into a vessel to cure to form the Inventive Articles 1-13 and Comparative Articles 1-13, respectively. After curing, the Inventive and Comparative Articles are evaluated to determine force to crush, density, tensile hardness, elongation, Graves tear, indention force deflection, sag, resilience, wet sets, pounding fatigue including thickness loss, hardness loss, and Fraizer airflow.

Table 2 below lists components and amounts of the components included in the Inventive and Comparative Articles respectively. Solids content is provided as percent by weight based on the total weight of the respective graft polyol present. Polyols A-C, Conventional Graft Polyols A-D, Inventive Graft Polyols A-B, and castor oil are provided in percent by weight based on the total weight of Polyols A-C, Conventional Graft Polyols A-D, Inventive Graft Polyols A-B, and Castor Oil present. All other components are provided as parts by weight based on 100 parts of Polyols A-C, Conventional Graft Polyols A-D, Inventive Graft Polyols A-B, and Castor Oil present.

TABLE 2

|  | Inventive Article | | | | | |
|---|---|---|---|---|---|---|
|  | I-1 | I-2 | I-3 | I-4 | I-5 | I-6 |
| solids content, % | 12 | 12 | 12 | 12 | 12 | 12 |
| Polyol A, % | 64 | 64 | 64 | 64 | 80 | 80 |
| Polyol B, % | 16 | 16 | 16 | 16 | — | — |
| Inventive Graft Polyol A, % | 20 | 20 | 20 | 20 | 20 | 20 |
| Crosslinking Agent, % | 1 | 1 | 1 | 1 | 1 | 1 |
| Catalyst A, % | 0.32 | 0.32 | 0.32 | 0.32 | 0.32 | 0.32 |
| Catalyst, % | 0.08 | 0.08 | 0.08 | 0.08 | 0.08 | 0.08 |
| Water, % | 2.2 | 2.2 | 2.2 | 2.2 | 2.2 | 2.2 |
| Surfactant A, % | 1 | 1 | 1 | 1 | 1 | 1 |
| ratio (100r:t) | 27.53 | 27.53 | 27.53 | 27.53 | 27.29 | 27.92 |
| mix res/iso** | 674/186 | 674/186 | 674/186 | 674/186 | 676/184 | 676/184 |
| block weight (g) | 745 | 745 | 745 | 746 | 742 | 744 |

|  | Inventive Article | | | | | | |
|---|---|---|---|---|---|---|---|
|  | I-7 | I-8 | I-9 | I-10 | I-11 | I-12 | I-13 |
| solids content, % | 12 | 12 | 60 | 30 | 15 | 8 | 59.62 |
| Polyol A, % | 80 | 80 | — | — | — | — | — |
| Polyol C, % | — | — | — | — | — | — | 88.7 |
| Conventional Graft Polyol C, % | — | — | — | 50 | 75 | 87 | — |
| Inventive Graft Polyol A, % | 20 | 20 | — | — | — | — | — |
| Inventive Graft Polyol B, % | — | — | 100 | 50 | 25 | 13 | 11.3 |
| Crosslinking Agent, % | 1 | 1 | — | — | — | — | — |
| Catalyst A, % | 0.32 | 0.32 | 0.5 | 0.5 | 0.5 | 0.5 | 0.25 |
| Catalyst B, % | 0.08 | 0.08 | — | — | — | — | 0.3 |
| Catalyst C, % | — | — | 0.15 | 0.15 | 0.15 | 0.15 | — |
| Catalyst D, % | — | — | — | — | — | — | 0.1 |
| Water, % | 2.2 | 2.2 | 3.3 | 3.3 | 3.3 | 3.3 | 1.2 |
| Surfactant A, % |  | 1 | — | — | — | — | — |

TABLE 2-continued

|  |  |  |  |  |  |  |  |
|---|---|---|---|---|---|---|---|
| Surfactant B, % | — | — | 1 | 1 | 1 | 1 | 0.1 |
| Surfactant C, % | — | — | — | — | — | — | 0.25 |
| Processing Additive, % | — | — | — | — | — | — | 1 |
| ratio (100r:t) | 27.29 | 27.29 | 38.31 | 40.42 | 41.48 | 41.99 | N/A |
| mix res/iso** | 676/184 | 676/184 | 524/201 | 516/209 | 512/213 | 511/214 | N/A |
| block weight (g) | 743 | 742 | N/A | N/A | N/A | N/A | N/A |

| | Comparative Article | | | | | |
|---|---|---|---|---|---|---|
| | C-1 | C-2 | C-3 | C-4 | C-5 | C-6 |
| solids content, % | 12 | 12 | 12 | 12 | 12 | 12 |
| Polyol A, % | 64 | 64 | 64 | 64 | 64 | 64 |
| Conventional Graft Polyol A, % | 28 | 28 | 28 | 28 | 28 | 28 |
| Crosslinking Agent, % | 1 | 1 | 1 | 1 | 1 | 1 |
| Catalyst A, % | 0.32 | 0.32 | 0.32 | 0.32 | 0.32 | 0.32 |
| Catalyst B, % | 0.08 | 0.08 | 0.08 | 0.08 | 0.08 | 0.08 |
| Water, % | 2.2 | 2.2 | 2.2 | 2.2 | 2.2 | 2.2 |
| Surfactant A, % | 1 | 1 | 1 | 1 | 1 | 1 |
| Castor Oil A, % | 8 | 8 | 8 | 8 | — | — |
| Castor Oil B, % | — | — | — | — | 8 | 8 |
| ratio (100r:t) | 28.87 | 28.87 | 28.87 | 28.87 | 28.87 | 28.87 |
| mix res/iso** | 667/193 | 667/193 | 667/193 | 667/193 | 667/193 | 667/193 |
| block weight (g) | 745 | 746 | 744 | 744 | 743 | 746 |

| | Comparative Article | | | | | | |
|---|---|---|---|---|---|---|---|
| | C-7 | C-8 | C-9 | C-10 | C-11 | C-12 | C-13 |
| solids content, % | 12 | 12 | 60 | 30 | 15 | 8 | 45 |
| Polyol A, % | 64 | 64 | — | — | — | — | — |
| Polyol C, % | — | — | — | — | — | — | 85 |
| Conventional Graft Polyol A, % | 28 | 28 | — | — | — | — | — |
| Conventional Graft Polyol B, % | — | — | 100 | 50 | 25 | 13 | — |
| Conventional Graft Polyol C, % | — | — | — | 50 | 75 | 87 | — |
| Conventional Graft Polyol D, % | — | — | — | — | — | — | 15 |
| Crosslinking Agent, % | 1 | 1 | — | — | — | — | — |
| Catalyst A, % | 0.32 | 0.32 | 0.5 | 0.5 | 0.5 | 0.5 | 0.25 |
| Catalyst B, % | 0.08 | 0.08 | — | — | — | — | 0.3 |
| Catalyst C, % | — | — | 0.15 | 0.15 | 0.15 | 0.15 | — |
| Catalyst D, % | — | — | — | — | — | — | 0.1 |
| Water, % | 2.2 | 2.2 | 3.3 | 3.3 | 3.3 | 3.3 | 1.2 |
| Surfactant A, % | 1 | 1 | — | — | — | — | — |
| Surfactant B, % | — | — | 1 | 1 | 1 | 1 | 0.1 |
| Surfactant C, % | — | — | — | — | — | — | 0.25 |
| Castor Oil B, % | 8 | 8 | — | — | — | — | — |
| Processing Additive, % | — | — | — | — | — | — | 1 |
| ratio (100r:t) | N/A | N/A | 37.01 | 39.77 | 41.15 | 41.82 | 41.22 |
| mix res/iso** | 667/193 | 667/193 | 529/196 | 519/206 | 514/211 | 511/214 | 708/292 |
| block weight (g) | 745 | 743 | N/A | N/A | N/A | N/A | N/A |

**Total parts resin side to total parts isocyanate side.

Polyol A is commercially available from BASF Corporation under the trade name of Pluracol® 380, and includes a hydroxyl number of 24.0-26.0 mg KOH/gm and a nominal functionality of 3.

Polyol B is commercially available from BASF Corporation under the trade name of Pluracol® 945, and includes a hydroxyl number of 34.0-36.0 mg KOH/gm and a nominal functionality of 3.

Polyol C is commercially available from Arch Chemicals, Inc. under the trade name of Poly G® 30-168, and includes a hydroxyl number of 168 mg KOH/gm.

Conventional Graft Polyol A is commercially available from BASF Corporation under the trade name of Pluracol® 1528 polyol.

Conventional Graft Polyol B is commercially available from BASF Corporation under the trade name of Pluracol® 5260 polyol.

Conventional Graft Polyol C is commercially available from BASF Corporation under the trade name of Pluracol® 2085 polyol.

Conventional Graft Polyol D is commercially available from BASF Corporation under the trade name of Pluracol® 4600 polyol Crosslinking Agent is commercially available from Air Products and Chemicals, Inc. of Allentown, Pa., under the name of DABCO® DEOA-LF Catalyst A is commercially available from Air Products and Chemicals, Inc. under the trade name of DABCO® 33LV.

Catalyst B is commercially available from Air Products and Chemicals, Inc. under the trade name of DABCO® BL11.

Catalyst C is commercially available from Air Products and Chemicals, Inc. under the trade name of DABCO® T9.

Catalyst D is commercially available from Air Products and Chemicals, Inc. under the name of DABCO® T10.

Surfactant A is commercially available from Air Products and Chemicals, Inc. under the trade name of DABCO® DC-5043.

Surfactant B is commercially available from Osi Specialties, Inc. of Sistersville, W. Va., under the trade name of DABCO® L620.

Surfactant C is commercially available from Momentive Performance Materials of Albany, N.Y., under the trade name of Niax L5614.

Castor Oil A is commercially available from Air Products and Chemicals, Inc. under the trade name of T31® Oil.

Castor Oil B is commercially available from Eagle Specialty Products of St. Louis, Mo., under the name of T500 Oil.

Processing Additive is commercially available from Momentive Performance Materials under the name of Niax Processing Additive DP-1022.

"Force to Crush" Evaluation of Inventive and Comparative Articles:

Table 3 below provides results for force to crush for each of the Inventive Articles 1, 4, 5, and 8, and the Comparative Articles 2, 3, 6, and 7. Force to crush is evaluated by an internal method.

TABLE 3

| FTC Run | I-1 | I-4 | I-5 | I-8 |
|---|---|---|---|---|
| 1 | 129 | 141 | 107 | 99 |
| 2 | 38 | 39 | 35 | 34 |
| 3 | 27 | 26 | 28 | 24 |
| 4 | 23 | 24 | 26 | 23 |
| 5 | 24 | 23 | 25 | 25 |
| 6 | 24 | 24 | 25 | 25 |
| 7 | 25 | 24 | 25 | 25 |
| 8 | 25 | 23 | 26 | 27 |
| 9 | 24 | 25 | 25 | 24 |
| 10 | 24 | 24 | 26 | 27 |

| FTC Run | C-2 | C-3 | C-6 | C-7 |
|---|---|---|---|---|
| 1 | 56 | 52 | 69 | 58 |
| 2 | 27 | 28 | 33 | 27 |
| 3 | 23 | 25 | 31 | 25 |
| 4 | 25 | 24 | 33 | 22 |
| 5 | 25 | 24 | 31 | 23 |
| 6 | 24 | 26 | 30 | 26 |
| 7 | 26 | 27 | 31 | 24 |
| 8 | 25 | 25 | 36 | 25 |
| 9 | 27 | 26 | 31 | 26 |
| 10 | 26 | 29 | 32 | 26 |

The Inventive Articles including the reaction product of a di- and/or poly-isocyanate and the graft polyol of the present invention exhibit superior force to crush values relative to the Comparative Articles. More specifically, the Inventive Articles have an increased initial force to crush value and comparable subsequent force to crush values indicative of a more stable polyurethane article.

Density, Tensile Hardness, Elongation, and Graves Tear Evaluation of Inventive and Comparative Articles:

Additionally, Inventive Articles 1, 4, 5, 8, 9, 10, 11, 12, and 13, and Comparative Articles 1, 4, 5, 8, 9, 10, 11, 12, and 13 are evaluated for density, tensile hardness, elongation, and Graves tear in accordance with ASTM D3574 and ASTM D624, as set forth in Table 4 below.

TABLE 4

| | Inventive Article | | | | | | | | |
|---|---|---|---|---|---|---|---|---|---|
| | I-1 | I-4 | I-5 | I-8 | I-9 | I-10 | I-11 | I-12 | I-13 |
| Density, pcf | 2.7 | N/A | 2.78 | N/A | N/A | 1.6 | 1.66 | 1.68 | 4.71 |
| Tensile HA, psi | N/A | 15 | N/A | 14 | N/A | 13 | 14 | 13 | 6 |
| Elongation, % | N/A | 128 | N/A | 142 | N/A | 60 | 96 | 120 | 132 |
| Graves tear, ppi | N/A | 3 | N/A | 3.4 | N/A | 1 | 1.9 | 1.9 | 1.2 |

| | Comparative Article | | | | | | | | |
|---|---|---|---|---|---|---|---|---|---|
| | C-1 | C-4 | C-5 | C-8 | C-9 | C-10 | C-11 | C-12 | C-13 |
| Density, pcf | 2.69 | N/A | 2.75 | N/A | 1.76 | 1.65 | 1.67 | 1.72 | 4.69 |
| Tensile HA, psi | N/A | 20 | N/A | 21 | 23 | 19 | 18 | 16 | 6 |
| Elongation, % | N/A | 151 | N/A | 157 | 32 | 89 | 136 | 144 | 135 |
| Graves tear, ppi | N/A | 3.5 | N/A | 3.5 | 1.1 | 2.4 | 2.3 | 2.3 | 1.3 |

The Inventive Articles including the reaction product of a di- and/or poly-isocyanate and the graft polyol of the present invention exhibit lower or comparable density, hardness, elongation, and Graves tear relative to the Comparative Articles and are more environmentally friendly. More specifically, the Inventive Articles are softer than the Comparative Articles.

Indentation Force Deflection Evaluation of Inventive and Comparative Articles:

Table 5 provide results for indentation force deflection (IFD), tested in accordance with ASTM D3574, of the Inventive Articles 1, 4, 5, 8, 9, 10, 11, 12, and 13 and the Comparative Articles 1, 4, 5, 8, 9, 10, 11, 12, and 13.

TABLE 5

| IFD, lbs/ 50 in² | I-1 | I-4 | I-5 | I-8 | I-9 | I-10 | I-11 | I-12 | I-13 |
|---|---|---|---|---|---|---|---|---|---|
| 25% | 23 | 23 | 21 | 22 | N/A | 43 | 34 | 31 | 9 |
| 65% | 70 | 69 | 61 | 62 | N/A | 91 | 67 | 59 | 24 |

| IFD, lbs/ 50 in² | C-1 | C-4 | C-5 | C-8 | C-9 | C-10 | C-11 | C-12 | C-13 |
|---|---|---|---|---|---|---|---|---|---|
| 25% | 26 | 31 | 26 | 28 | 152 | 59 | 39 | 34 | 11 |
| 65% | 78 | 81 | 78 | 78 | 387 | 114 | 74 | 64 | 27 |

The Inventive Articles including the reaction product of a di- and/or poly-isocyanate and the graft polyol of the present invention exhibit comparable IFD values relative to the Comparative Articles.

Sag, Resilience, and Wet Set Evaluation of Inventive and Comparative Articles:

Further, Table 6 provide results for evaluation of sag, resilience, and wet sets, tested in accordance with ASTM D3574, of the Inventive Articles 1, 4, 5, 8, 9, 10, 11, 12, and 13 and the Comparative Articles 1, 4, 5, 8, 9, 10, 11, 12, and 13.

TABLE 6

| | Inventive Article | | | | | | | | |
|---|---|---|---|---|---|---|---|---|---|
| | I-1 | I-4 | I-5 | I-8 | I-9 | I-10 | I-11 | I-12 | I-13 |
| sag | 3 | 2.9 | 2.9 | 2.9 | N/A | 2.1 | 1.9 | 1.9 | 2.6 |
| Resilience, % | 59 | 59 | 59 | 81 | N/A | N/A | N/A | N/A | 1 |
| Wet Sets | N/A | 11 | N/A | 18 | N/A | 13 | 4 | 4 | 1.6 |

| | Comparative Article | | | | | | | | |
|---|---|---|---|---|---|---|---|---|---|
| | C-1 | C-4 | C-5 | C-8 | C-9 | C-10 | C-11 | C-12 | C-13 |
| sag | 2.8 | 2.6 | 2.8 | 2.8 | 2.5 | 1.9 | 1.9 | 1.9 | 2.52 |
| Resilience, % | 57 | 60 | 60 | 60 | N/A | N/A | N/A | N/A | 1 |
| Wet Sets | N/A | 10 | N/A | 12 | 41 | 15 | 6 | 4 | 1.7 |

The Inventive Articles including the reaction product of a di- and/or poly-isocyanate and the graft polyol of the present invention exhibit comparable or superior sag, resilience, and wet set values relative to the Comparative Articles. In particular, the Inventive Articles have exhibit improved sag values relative to the Comparative Articles.

Pounding Fatigue Evaluation of Inventive and Comparative Articles:

Further still, Table 7 provide results for evaluation of pounding fatigue, including thickness loss and hardness loss, tested in accordance with ASTM D3574, of the Inventive Articles 1 and 5, and the Comparative Articles 1 and 5.

TABLE 7

| | Inventive Article - Pounding fatigue | |
|---|---|---|
| | I-1 | I-5 |
| Thickness loss % | 1.4 | 1.3 |
| Hardness loss - 40 ⅔ | 11 | 12 |

TABLE 7-continued

| | Comparative Article - Pounding fatigue | |
|---|---|---|
| | C-1 | C-5 |
| Thickness loss % | 1.5 | 1.5 |
| Hardness loss - 40 ⅔ | 13 | 14 |

The Inventive Articles including the reaction product of a di- and/or poly-isocyanate and the graft polyol of the present invention exhibit comparable pounding fatigue relative to the Comparative Articles.

Fraizer Airflow Evaluation of Inventive and Comparative Examples:

Still Further yet, Table 8 provide results for evaluation of Fraizer Airflow, tested in accordance with ASTM 737, of the Inventive Articles 4, 8, 10, 11, 12, and 13, and the Comparative Articles 4, 8, 9, 10, 11, 12, and 13.

TABLE 8

| | Inventive Article | | | | | |
|---|---|---|---|---|---|---|
| | I-4 | I-8 | I-10 | I-11 | I-12 | I-13 |
| Fraizer Airflow, cfm/ft² | 126 | 146 | 230 | 258 | 262 | 16 |

| | Comparative Article | | | | | | |
|---|---|---|---|---|---|---|---|
| | C-4 | C-8 | C-9 | C-10 | C-11 | C-12 | C-13 |
| Fraizer Airflow, cfm/ft² | 180 | 106 | 94 | 152 | 204 | 223 | 17 |

The polyurethane articles including the reaction product of a di- and/or poly-isocyanate and the graft polyol of the present invention have comparable or superior physical properties relative to polyurethane articles formed from conventional graft polyols or conventional graft polyols and castor oil. The Inventive Articles are softer and exhibit superior force to crush and sag values relative to the Comparative Articles. Furthermore, the Inventive Articles generally exhibit improved odor relative to Comparative Articles formed using castor oil. Additionally, the Comparative Articles have an increased bio-content and require no petroleum-based polyols. Therefore the Inventive Articles are more suitable for environmentally friendly applications and/or products such as seat cushions than the Comparative Articles. However, each of the Inventive Articles 1 through 13 are exemplary of the present invention and may be useful for a variety of applications including both automotive and non-automotive applications such as in farming or sporting applications in seats, panels, doors, and the like.

Formation of Pavement Compositions:

Inventive Graft Polyol C as well as Castor Oil is utilized to form a binder for pavement compositions. Specifically, Inventive Graft Polyol C is utilized to form Inventive Pavement Compositions 1, 2, and 3.

The Inventive and Comparative Pavement Compositions are formed in accordance with the methods incorporated by reference as set forth above. After formation, the Inventive and Comparative Pavement Compositions are evaluated to determine density, Graves tear, hardness, elongation, and tensile strength.

Table 9 below lists components and amounts of the components included in the Inventive Pavement Compositions 1-3.

TABLE 9

|  | Inventive Pavement Composition | | |
|---|---|---|---|
|  | I-1 | I-2 | I-3 |
| Polyol A | 16.4 | 16.4 | 14.9 |
| Polyol B | 4.1 | 4.1 | 3.7 |
| Inventive Graft Polyol C | 78.45 | 78.45 | 71.25 |
| Castor Oil | — | — | — |
| Dipropylene glycol | — | — | 9.1 |
| Molecular Sieve 3A | 0.5 | 0.5 | 0.5 |
| Aminosilane | 0.5 | 0.5 | 0.5 |
| Antifoam | 0.05 | 0.05 | 0.05 |
| Total | 100 | 100 | 100 |
| Equivalent Wt. of Resin, g | 577 | 577 | 341 |
| Equivalent Wt. of Isocyanate A, g | 134 | 134 | 134 |
| Equivalent Wt. of Isocyanate B, g | — | — | — |
| Ratio of Resin to Isocyanate by weight | 4.095 | 4.095 | 2.421 |

Table 18 and Table 19 below lists components and amounts of the components included in the Comparative Pavement Compositions.

TABLE 9

|  | Comparative Pavement Composition | | | |
|---|---|---|---|---|
|  | C-1 | C-2 | C-3 | C-4 |
| Polyol A | 16.4 | 14.9 | 14.9 | 16.4 |
| Polyol B | 4.1 | 3.7 | 3.7 | 4.1 |
| Inventive Graft Polyol C | — | — | — | — |
| Castor Oil | 78.45 | 71.25 | 71.25 | 78.45 |
| Dipropylene glycol | — | 9.1 | 9.1 | — |
| Molecular Sieve 3A | 0.5 | 0.5 | 0.5 | 0.5 |
| Aminosilane | 0.5 | 0.5 | 0.5 | 0.5 |
| Antifoam | 0.05 | 0.05 | 0.05 | 0.05 |
| Total | 100 | 100 | 100 | 100 |

|  | Comparative Pavement Composition | | |
|---|---|---|---|
|  | C-1 | C-2 | C-3 |
| Equivalent Wt. of Resin, g | 351 | 253 | 253 |
| Equivalent Wt. of Isocyanate A, g | 134 | 134 | — |
| Equivalent Wt. of Isocyanate B, g | — | — | 183 |
| Ratio of Resin to Isocyanate by weight | 2.488 | 1.798 | 1.315 |

Polyol A is commercially available from Cognis of Monheim, Germany, under the trade name of Sovermol® 1005.

Polyol B is commercially available from Cognis under the trade name of Sovermol® 750.

Castor Oil is commercially available from Air Products and Chemicals, Inc. under the trade name of T31® Oil.

Aminosilane is commercially available from Momentive Performance Materials, under the trade name of Silquest® A-1100.

Antifoam is commercially available from Dow Corning Corporation of Midland, Mich., under the trade name of Dow Corning® Antifoam A Compound.

Isocyanate A is commercially available from BASF Corporation under the trade name of Lupranate® M20.

Isocyanate B is commercially available from BASF Corporation under the trade name of Lupranate® MP-102.

Density, Graves Tear, Hardness, Elongation, Tensile Strength, and Hydrophobicity Evaluation of Inventive and Comparative Pavement Compositions:

Additionally, Table 10 provides results for evaluation of density (ASTM D792), Graves tear (ASTM D624), hardness (ASTM D2240), elongation (ASTM D3574), tensile strength (ASTM D3574), and hydrophobicity ratings (qualitative internal rating) of the Inventive Pavement Compositions 1 through 3 and the Comparative Pavement Compositions 1 through 3.

TABLE 10

|  | Inventive Pavement Composition | | |
|---|---|---|---|
|  | I-1 | I-2 | I-3A |
| Density, lbs/ft$^3$ | 62.53 | 64.85 | 66.73 |
| Graves Tear, ppi | 97 | 78 | 157 |
| Shore A Hardness at Instant | 88 | 84 | 96 |
| Shore A Hardness at Dwell | 87 | 84 | 96 |
| Elongation, % | 38 | 34 | 13 |
| Tensile Strength, psi | 1,924 | 1,539 | 3229 |
| Hydrophobicity rating** | 2 | 3 | N/A |

|  | Comparative Pavement Composition | | |
|---|---|---|---|
|  | C-1 | C-2A | C-2B |
| Density, lbs/ft$^3$ | 64.3 | 62.99 | 68.39 |
| Graves Tear, ppi | 53 | 1,125 | 2,219 |
| Shore A Hardness at Instant | 72 | 90 | 93 |
| Shore A Hardness at Dwell | 68 | 89 | 92 |
| Shore D Hardness at Instant | N/A | 53 | 57 |
| Shore D Hardness at Dwell | N/A | 46 | 53 |
| Elongation, % | 86 | 53 | 114 |
| Tensile Strength, psi | 1,014 | 10,416 | 12,333 |
| Hydrophobicity rating** | 3 | N/A | N/A |

**On a scale of 1 to 3, where 2 is superior to 1, and 3 is superior to 2.

The Inventive Pavement Compositions 1 through 3 have comparable and improved physical properties relative to the Comparative Pavement Compositions 1 through 3. More specifically, the Inventive Pavement Compositions 1 through 3 have increased bio-content and improved Shore A hardness relative to the Comparative Pavement Compositions 1 through 3. Accordingly, Inventive Pavement Compositions 1 through 3 are suitable for applications such as surface paving.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the scope of the appended claims, the present invention may be practiced otherwise than as specifically described. The subject matter of all combinations of independent and dependent claims, both singly and multiply dependent, is herein expressly contemplated.

What is claimed is:

1. A graft polyol comprising:
A) a natural oil comprising at least 50% by weight of a natural oil polyol represented by formula (I);

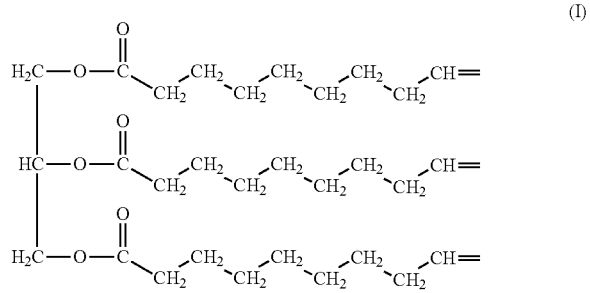

-continued

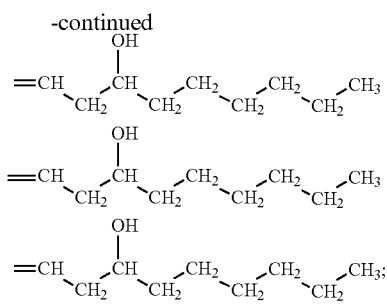

and
B) particles dispersed in said natural oil A) and comprising the reaction product of;
 i) a reactor charge comprising a macromer polyol and a portion of said natural oil,
 ii) a polymerizable monomer,
 iii) a chain transfer agent, and
 iv) a free radical initiator, and
 v) a macromer charge different from said reactor charge and also comprising said macromer polyol;
wherein said reactor charge, said polymerizable monomer, said chain transfer agent, and said free radical initiator react in the presence of said natural oil to form a reaction intermediary, and said reaction intermediary reacts with said macromer in said macromer charge in the presence of said natural oil to form particles B) dispersed in the natural oil A).

2. The graft polyol as set forth in claim 1, having a solids content of at least 25% by weight of said graft polyol.

3. The graft polyol as set forth in claim 1, having a viscosity of less than 30,000 cP measured at 25° C.

4. The graft polyol as set forth in claim 1, wherein said macromer polyol comprises;
 i) the reaction product of a sorbitol initiated polyol and an ethylenically unsaturated compound, in the presence of a catalyst, or
 ii) a fumarate.

5. The graft polyol as set forth in claim 4, wherein said macromer polyol comprises the reaction product i) and the ethylenically unsaturated compound is α,α-dimethyl-meta-isopropenylbenzyl isocyanate.

6. The graft polyol as set forth in claim 1, wherein said particles have a volume weighted mean particle diameter of at least 2 μm and/or at least 10% of said particles have a volume weighted mean particle diameter of at least 10 μm.

7. The graft polyol as set forth in claim 1, wherein said chain transfer agent is a thiol.

8. A method of forming a graft polyol, said method comprising the steps of:
providing A) a natural oil comprising at least 50% by weight of a natural oil polyol represented by the formula (I);

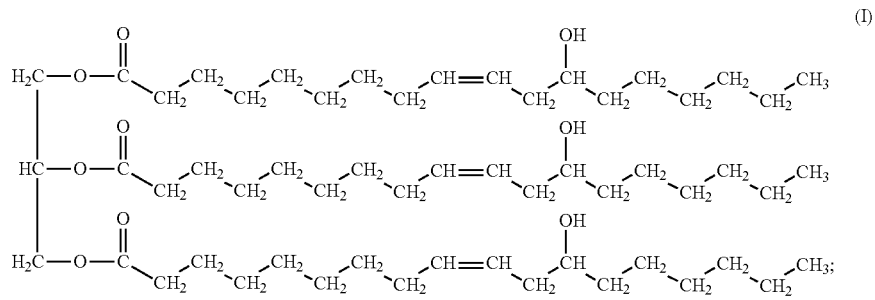 [SMILES: CCCCCCC(O)C/C=C\CCCCCCCC(=O)OCC(COC(=O)CCCCCCC/C=C\CC(O)CCCCCC)OC(=O)CCCCCCC/C=C\CC(O)CCCCCC]

providing each of a macromer polyol, a chain transfer agent, a free radical initiator, and a polymerizable monomer;

combining the natural oil A), the macromer polyol, the chain transfer agent, the free radical initiator, and the polymerizable monomer wherein a first portion of the natural oil A) is combined with the macromer polyol to form a reactor charge prior to combining a remaining portion of the natural oil A), the chain transfer agent, the free radical initiator, and the polymerizable monomer; and reacting the polymerizable monomer, the macromer polyol, and the free radical initiator wherein the polymerizable monomer, the reactor charge, and the free radical initiator are reacted to form a reaction intermediary and the reaction intermediary is further reacted with a macromer charge different from the reactor charge and also comprising the macromer polyol to form B) particles dispersed in the natural oil A).

9. The method as set forth in claim 8, wherein the graft polyol has a solids content of at least 25% by weight of the graft polyol.

10. The method as set forth in claim 8, wherein the graft polyol has a viscosity of less than 30,000 cP measured at 25° C.

11. The method as set forth in claim 8, wherein the macromer polyol comprises;
i) the reaction product of a sorbitol initiated polyol and an ethylenically unsaturated compound, in the presence of a catalyst, or
ii) a fumarate.

12. The method as set forth in claim 11, wherein the macromer polyol comprises the reaction product i) and the ethylenically unsaturated compound is α,α-dimethyl-meta-isopropenylbenzyl isocyanate.

13. The method as set forth in claim 8, wherein the particles have a volume weighted mean particle diameter of at least 2 µm and/or at least 10% of the particles have a volume weighted mean particle diameter of at least 10 µm.

14. A polyurethane article comprising the reaction product of a di- and/or poly-isocyanate and a graft polyol comprising:
A) a natural oil comprising at least 50% by weight of a natural oil polyol represented by formula (I);

$$\text{(I)}$$

and

B) particles dispersed in said natural oil A) and comprising the reaction product of;
i) a reactor charge comprising a macromer polyol and a portion of said natural oil,
ii) a polymerizable monomer,
iii) a chain transfer agent, and
iv) a free radical initiator, and
v) a macromer charge different from said reactor charge and also comprising said macromer polyol;

wherein said reactor charge, said polymerizable monomer, said chain transfer agent, and said free radical initiator react in the presence of said natural oil to form a reaction intermediary, and said reaction intermediary reacts with said macromer in said macromer charge in the presence of said natural oil to form particles B) dispersed in the natural oil A).

15. The polyurethane article as set forth in claim 14, wherein said graft polyol has a solids content of at least 25% by weight of said graft polyol.

16. The polyurethane article as set forth in claim 14, having;
i) a tensile hardness of less than 20 psi (137.9 kPa), and/or
ii) an indentation force deflection value at 25% of from 5 to 45 lbs/50in² (0.69 to 6.2 kPa), and/or
iii) an indentation force deflection value at 65% of from 20 to 90 lbs/50in² (2.7 to 12.4 kPa).

17. The polyurethane article as set forth in claim 14, wherein the reaction product includes the macromer charge v).

18. The polyurethane article as set forth in claim 16, having;
i) a tensile hardness of less than 20 psi (137.9 kPa),
ii) an indentation force deflection value at 25% of from 5 to 45 lbs/50in² (0.69 to 6.2 kPa), and
iii) an indentation force deflection value at 65% of from 20 to 90 lbs/50in² 2.7 to 12.4 kPa).

* * * * *